United States Patent [19]

Gerrits

[11] 4,029,152

[45] June 14, 1977

[54] SOD CUTTING MACHINE WITH OPPOSITELY RECIPROCATING UNDERCUTTING AND SIDE CUTTING KNIVES

[75] Inventor: Theodorus Petrus Hubertus Gerrits, Newmarket, Canada

[73] Assignee: Brouwer Turf Equipment Limited, Keswick, Canada

[22] Filed: Oct. 1, 1975

[21] Appl. No.: 618,593

[52] U.S. Cl. .................................. 172/19; 172/53; 172/68; 172/101
[51] Int. Cl.² ...................................... A01B 45/04
[58] Field of Search .................. 172/19, 20, 40, 48, 172/50, 53, 54, 57, 93, 94, 97, 101, 102, 125, 613, 614, 68; 56/246, 247, 248, 293; 37/DIG. 18

[56] References Cited

UNITED STATES PATENTS

| 2,682,824 | 7/1954 | Bowser et al. | 172/19 |
| 3,357,499 | 12/1967 | Finneyfrock | 172/19 |
| 3,509,944 | 5/1970 | Brouwer et al. | 172/19 |
| 3,747,686 | 7/1973 | Beck | 172/20 |
| 3,807,504 | 4/1974 | Nunes, Jr. | 172/20 |
| 3,812,918 | 5/1974 | Beck | 172/19 |

*Primary Examiner*—Richard T. Stouffer
*Attorney, Agent, or Firm*—Rogers, Bereskin & Parr

[57] ABSTRACT

A sod cutting machine having an undercutting blade to sever beneath a strip of sod, and a pair of separate side cutting blades, to cut the edges of the sod strip. The undercutting blade is supported by a pair of arms which are reciprocated back and forth in the direction of travel of the machine. The side cutting blades are supported by further arms which are connected by links to the undercutting blade support arms, so that the side cutting blades reciprocate oppositely to the reciprocation of the undercutting blade, thus reducing vibration. The side cutting blades are located one on each side of the roller which supports the front of the machine, and the undercutting blade is immediately behind the roller, to ensure alignment of the cuts.

6 Claims, 6 Drawing Figures

SOD CUTTING MACHINE WITH OPPOSITELY RECIPROCATING UNDERCUTTING AND SIDE CUTTING KNIVES

This invention relates to a sod cutting machine. Specifically, it relates to means for mounting and driving side cutting knives for a sod cutting machine.

Sod cutting machines are commonly used to cut strips of grass sod from a field of turf. In such machines there is a substantially horizontal undercutting blade to cut beneath the strip to be removed, and a pair of side cutting blades to cut the edges of the strip. (In addition there is a cross cutting blade to cut the strips into lengths but the present invention is not concerned with this blade.) Conventionally the side cutting blades are attached to the edges of the undercutting blade to form a composite knife, as shown in Canadian Pat. No. 641,787 issued May 29, 1962 to Sod-Master Corporation. The knife shown in that patent may be used in a simple sod cutting machine, or it may be used in a machine of the kind shown in Brouwer U.S. Pat. No. 3,509,944 issued on May 5, 1970 (which machine both cuts and rolls up the sod).

The cutting knife shown in Canadian Pat. No. 641,787 has certain disadvantages. Firstly, the side cutting blades and the undercutting blade all have the same stroke (since they are rigidly connected together), whereas under some conditions strokes of differing length or speed may be desirable. Secondly, the side cutting blades add considerable mass to the vibrating knife, and the resulting vibration can increase the rate at which the sod cutting machine wears out.

Accordingly it is an object of this invention to provide, for a sod cutting machine, an arrangement in which the side cutting knives are mounted on oscillatable support arms separate from the arms on which the undercutting blade is mounted, so that the stroke of the side cutting knives can be adjusted independently of the undercutting knife to suit the sod being cut. In the preferred embodiment of the invention, the side cutting blades of the side cutting knives are formed as simple inserts that are inexpensive to manufacture and which can easily be removed and replaced after they are worn. In addition, in the preferred embodiment of the invention, the side cutting knives are reciprocated in opposition to the undercutting knife, to reduce vibration in the machine. Preferably the side cutting knives are mounted one on each side of the roller used normally to support and guide the sod cutting machine, to ensure alignment of the cuts and so that a substantial portion of the weight of the sod cutting machine is available to rest on the side cutting blades, so that they will penetrate the ground.

Further objects and advantages of the invention will appear from the following description, taken together with the accompanying drawings, in which.

Figure 1:
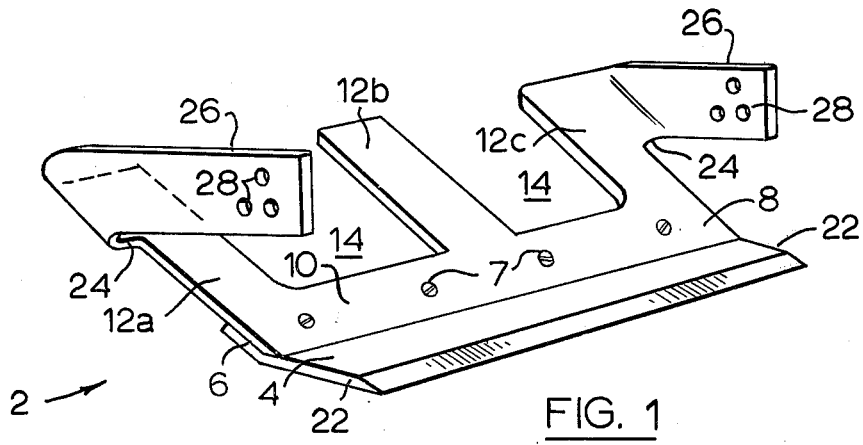
FIG. 1 is a perspective view of a typical sod undercutting knife which may be used with the invention.
Figure 2:
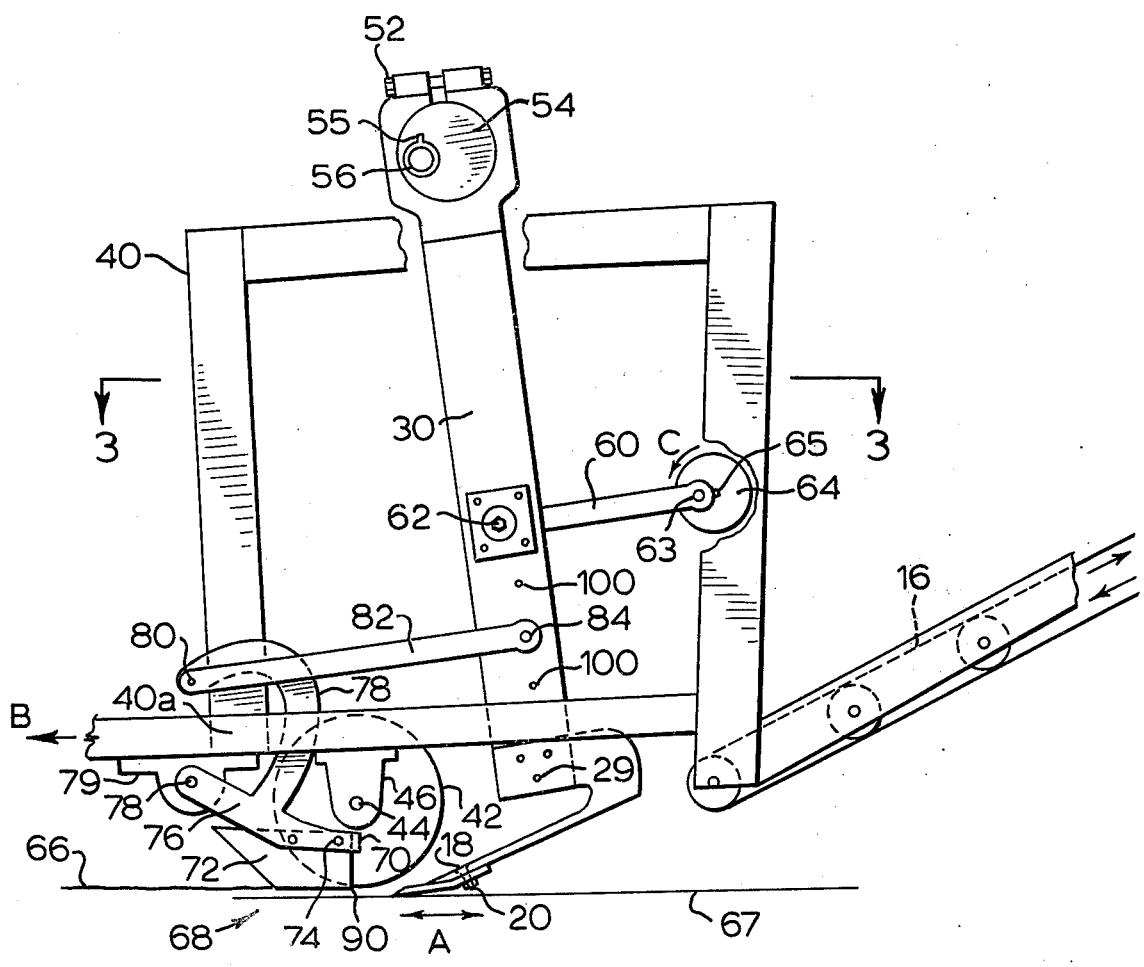
FIG. 2 is a side view of a portion of a sod harvesting machine and illustrating separate mounting of the side and undercutting knives.
Figure 3:
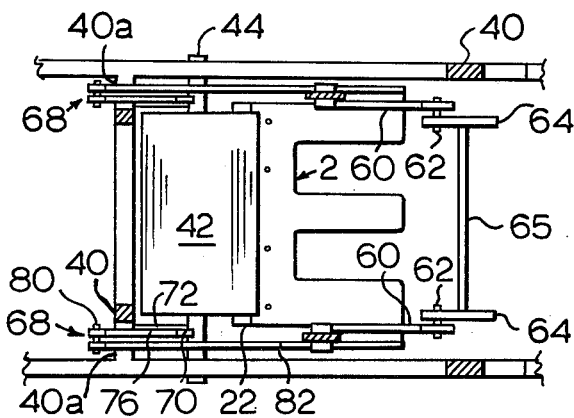
FIG. 3 is a sectional view taken along lines 3—3 of FIG. 2 with portions of the frame and driving mechanism omitted for clarity.
Figure 4:
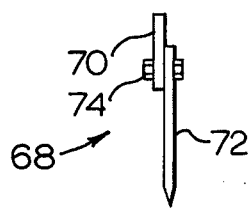
FIG. 4 is an end view of a side cutting blade and its holder.

Reference is first made to FIGS. 1 to 3, which show a typical sod undercutting knife 2 which may be used when side cutting blades according to the invention are used. The undercutting knife 2 includes an undercutting blade 4 mounted on a support member 6 by countersunk bolts 7. The blade 4 is an elongated, flat, thin, sharpened steel member that can be used until it is worn out and then scrapped. The blade 4 includes an upwardly bent rear portion 8 which accommodates the support member 6.

The support member 6 includes a front portion 10 extending parallel to the rear part 8 of the blade 4 and on which the blade rests, and three guide strips 12a, 12b, 12c extending rearwardly from the front portion 10 and defining large openings 14. (The number of guide strips is optional). The openings 14 reduce the weight of the cutting knife, hence reducing vibration. In addition, the openings 14 reduce the likelihood that dirt will accumulate on the rear portion of the undercutting knife. The guide strips serve to guide cut sod onto a following conveyor 16 (FIG. 2) without dirt accumulation, as disclosed in the said U.S. patent.

As shown in the drawings, the guide strips 12a, 12c at their ends remote from the front portion 10, extend laterally outwardly of the side edges 22 of the undercutting blade 4. The laterally porjecting portions are marked at 24. Connected to the laterally projecting portions 24 is a pair of mounting arms 26. The mounting arms 26 extend forwardly and generally horizontally, typically to a position adjacent the rear of the undercutting blade 4 (though their forward extension may be shorter if desired). At their forward ends, the mounting arms 26 contain holes 28 through which bolts 29 (FIG. 2) may be inserted to secure the mounting arms to carrying arms 30 (FIGS. 2,3) which are used to carry and to reciprocate the cutting knife 2.

The mounting of the undercutting knife 4 and of side cutting knives according to the invention will now be explained, with reference to FIGS. 2 to 5. Reference is first made to FIGS. 2 and 3, which show a portion of the frame 40 of a sod harvesting machine of the kind shown in the said U.S. patent. The frame 40 is supported, adjacent the front of the sod cutting machine, on a roller 42 having its central shaft 44 pivotally connected to the frame by bearing blocks 46. The roller is conventional and, is shown in the said U.S. patent, serves to carry the weight of the front of the machine and also to roll the sod before it is undercut.

Mounted on the frame 40 are the generally vertically oriented carrying arms 30, which support at their lower ends the undercutting knife 2. The carrying arms 30 are conventionally clamped at their upper ends, by bolts 52, on eccentric discs 54 secured (by keys 55) to a cross shaft 56. The shaft 56 is pivotally mounted in bearings (not shown) on the frame 40 so that it is free to rotate. Thus, during reciprocation the arms 30 and shaft 56 pivot in the frame bearings. In addition, the level at which the undercutting blade 4 is set can be controlled by loosening the bolts 52, rotating the eccentric discs 54 relative to the arms 30, and then retightening the bolts 52. This arrangement is entirely conventional.

The arms 30 are reciprocated by a pair of driving rods 60 pivotally connected at 62 to the arms 30 and pivotally connected at 63 to eccentrics 64. The eccentrics 64 are mounted on a shaft 65 driven in conventional manner by an oil motor (not shown) mounted on the frame. When the oil motor is energized, the undercutting knife 2 is rapidly reciprocated back and forth in the directon of arrow A, FIG. 2, to cut sod as the machine advances forwardly in the direction of arrow B. The top of the sod is indicated at 66, and the ground after the sod has been cut therefrom is indicated at 67, in FIG. 2. A crosscut blade, not shown, is provided as described in the said U.S. patent, to cut the strip of sod into lengths.

In accordance with the invention, two separately mounted side cutting knives are provided to cut the edges of the strip of sod. These knives, indicated at 68, consist of holders 70 (see also FIG. 4), with flat, thin, sharp, steel side cutting blades 72 bolted thereto by bolts 74. The holders 70 are integrally secured to the support and driving arms 76 which form part of the side cutting knives 68. The arms 76 extend upwardy and forwardly from the holders 70 and are pivoted to the frame 40 at pivot shafts 78 mounted in bearing blocks 79. As shown in FIG. 3, one side cutting blade 72 is aligned with each side edge 22 of the undercutting blade 4, one on each side of the roller 42.

The support arms 76 include integral extensions 78 which extend upwardly and then forwardly therefrom, over a horizontal cross-brace 40a of the frame 40. The extensions 78 are pivotally connected at 80 to a second set of driving rods 82. Each driving rod 82 extends to one of the carrying arms 30 and is pivotally connected at 84 thereto.

It will be seen that in the operation of the device described, when the undercutting knife 2 oscillates forwardly, the side cutting knives 68 oscillate rearwardly, and vice-versa. In the position drawn in FIGS. 2 and 3, the undercutting knife 2 is nearly in its most forward position, and the side cutting knives 68 are nearly in their most rearward position. In this position the side cutting blades 72 are raised slightly above the leading edge of the undercutting blade 4.

Figure 5:
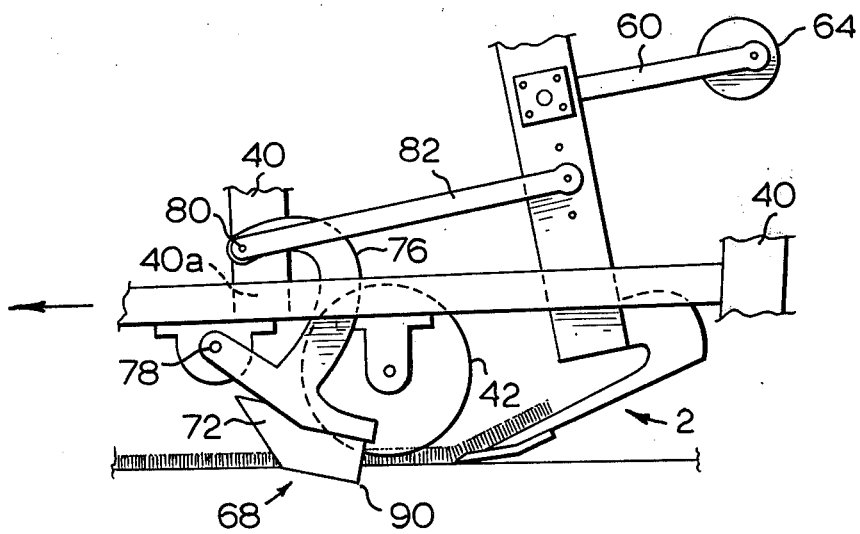
FIG. 5 is a view similar to that of FIG. 2 but showing the undercutting and side cutting knives at a different part of their stroke.

When the eccentric 64 rotates (in the directon of arrow C) to carry the pivot point 63 to its rearmost position, the arms 30 and hence the rods 82 are drawn rearwardly. This causes the side cutting knives to rotate clockwise about pivot point 78, causing the side cutting blades 72 to move forwardly and downwardly as shown in FIG. 5. The side cutting blades are thus rapidly and repeatedly driven forwardly and downwardly into the ground, to cut the edges of the sod.

The described countermovement of the two sets of knives considerably reduces vibration, as compared with the vibration that would occur if the undercutting and sod cutting knives all moved in the same direction at the same time. The lengthy rearward extension of holders 70 ensures that the rear bottom tips 90 of blades 72 are located at a substantial distance rearwardly of pivots 78. This ensures that the tips 90 of the blades 72 will have a substantial vertical component of movement, to produce a clean cut. In addition, the tips 90 are located relatively close to the undercutting blade 2, so that if the machine during its travel wanders slightly from a straight path, the cuts of the side cutting blades 72 and of the undercutting blade 4 will remain aligned.

If it is desired to have the stroke of the side cutting blades independently adjustable, as will frequently be the case, then a series of holes 100 may be provided in the arms 30, to vary the location of pivot point 84. This will also adjust the depth to which the side cutting blades 72 will cut.

Figure 6:
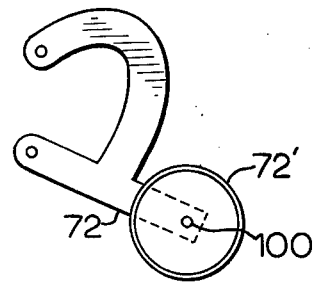
FIG. 6 is a side view showing another form of side cutting knife.

It will be appreciated that although the side cutting knives have been shown as driven from the members which carry and power the undercutting knife, any suitable separate power means may be used for the side cutting knives. Preferably however the same power means will be used for both the undercutting and side cutting blades, as illustrated, but the power means (the eccentrics 64) may be placed between the arms 76 and the arms 30, or forwardly of the arms 76, instead of rearwardly of the arms 30. If desired, the side cutting blades 72 may assume the form of rolling discs, as shown in Fig. 6, where primed reference numerals indicate parts corresponding to those of FIGS. 2 to 6. In FIG. 6 each side cutting blade 72' is in the form of a circular sharpened disc pivotally mounted at 100 on its holder 70. As the machine moves forwardly and as the holder 70 reciprocates, the disc blades 72' rotate on the pivots 100. With this arrangement, the amplitude of the reciprocation of arms 76 can be relatively small and for some types of sod can be reduced to zero. The disc 72' is relatively easy to sharpen and wears more evenly than do the sharpened bottom and front edges of blades 72.

What I claim is:

1. In a sod cutting machine adapted for travel forwardly along a path of travel to cut a strip of sod, improved means for cutting beneath said strip and for cutting the edges of said strip, comprising:
    a. a frame,
    b. an undercutting blade,
    c. a pair of first support arms one connected to each side of said undercutting blade and supporting said undercutting blade in an orientation in which said undercutting blade extends across said path of travel, for cutting beneath said strip,
    d. means pivotally connecting said first support arms to said frame for reciprocation of said undercutting blade in a direction having a horizontal component parallel to said path of travel,
    e. a pair of side cutting blades,
    f. a pair of second support arms one connected to each of said side cutting blades and supporting said side cutting blades in vertical planes parallel to said path of travel and substantially aligned with the outer edges of said undercutting blade for cutting the edges of said strip,
    g. means pivotally connecting said second support arms to said frame for reciprocation of said side cutting blades in a direction having a vertical component and having a horizontal component parallel to said path of travel,
    h. means connected to said first and second support arms for reciprocating said undercutting blade and said side cutting blades oppositely, so that said side cutting blades move forwardly when said undercutting blade moves rearwardly and so that said side cutting blades move rearwardly when said undercutting blade moves forwardly,
    i. said means for reciprocating including link means pivotally connected to said first support arms and pivotally connected to said second support arms and power means connected to one pair of said first and second support arms j. said link means comprising a pair of driving rods one connected between each of said first support arms and one of said second supports arms, k. each second support arm including a first portion having a first end pivotally connected to said frame, a second end connected to one of said side cutting blades, and a second portion extending upwardly from said first portion and having a free end above said first end and pivotally connected to one of said driving rods.

2. The invention according to claim 1 wherein said first end of said first portion is located forwardly and above said second end, and said second portion extends upwardly from said first portion at a location intermediate the ends of said first portion, said free end of said second portion extending forwardly along said path of travel from said location.

3. In a sod cutting machine adapted for travel forwardly along a path of travel to cut a strip of sod, improved means for cutting beneath said strip and for cutting the edges of said strip, comprising:

a. a frame, b. an undercutting blade, c. a pair of first support arms one connected to each side of said undercutting blade and supporting said undercutting blade in an orientation in which said undercutting blade extends across said path of travel, for cutting beneath said strip, d. means pivotally connecting said first support arms to said frame for reciprocation of said undercutting blade in a direction having a horizontal component parallel to said path of travel, e. a pair of side cutting blades, f. a pair of second support arms one connected to each of said side cutting blades and supporting said side cutting blades in vertical planes parallel to said path of travel and substantially aligned with the outer edges of said undercutting blade for cutting the edges of said strip, g. means pivotally connecting said second support arms to said frame for reciprocation of said side cutting blades in a direction having a substantial vertical component and having a horizontal component parallel to said path of travel, h. a single rotary power source mounted on said frame for providing power to reciprocate said first and second arms, i. and a mechanical linkage connecting said power source to said first and second arms for reciprocating said undercutting blade and said side cutting blades oppositely in continual mechanical synchronization, so that said side cutting blades move forwardly when said undercutting blade moves rearwardly and so that said side cutting blades move rearwardly when said undercutting blade moves forwardly.

4. The invention according to claim 3 wherein said mechanical linkage includes adjustment means for adjusting the stroke of said side cutting blades without adjusting the stroke of said undercutting blade.

5. The invention according to claim 3 wherein said mechanical linkage includes a pair of driving rods one connected between each of said first support arms and one of said second support arms.

6. The invention according to claim 3 wherein the vertical component of movement of said side cutting blades is greater than any vertical component of movement of said undercutting blade.

* * * * *